United States Patent
Kim et al.

(10) Patent No.: US 10,764,740 B2
(45) Date of Patent: Sep. 1, 2020

(54) METHOD FOR PERFORMING A PROCEDURE RELATED TO AMF REGISTRATION BY UDM IN WIRELESS COMMUNICATION SYSTEM AND APPARATUS FOR SAME

(71) Applicant: LG Electronics Inc., Seoul (KR)

(72) Inventors: Laeyoung Kim, Seoul (KR); Hyunsook Kim, Seoul (KR); Jinsook Ryu, Seoul (KR); Sangmin Park, Seoul (KR); Myungjune Youn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/660,167

(22) Filed: Oct. 22, 2019

(65) Prior Publication Data

US 2020/0092710 A1 Mar. 19, 2020

Related U.S. Application Data

(63) Continuation of application No. 16/064,942, filed as application No. PCT/KR2018/004885 on Apr. 26, 2018.

(Continued)

(51) Int. Cl.
*H04W 8/10* (2009.01)
*H04W 8/06* (2009.01)
(Continued)

(52) U.S. Cl.
CPC .............. *H04W 8/10* (2013.01); *H04W 8/06* (2013.01); *H04W 36/14* (2013.01); *H04W 60/06* (2013.01)

(58) Field of Classification Search
CPC ......... H04W 8/10; H04W 8/06; H04W 36/14; H04W 60/06
See application file for complete search history.

(56) References Cited

U.S. PATENT DOCUMENTS

2011/0090870 A1* 4/2011 Ronneke ............... H04W 76/27
370/331
2012/0026946 A1 2/2012 Zhu et al.
(Continued)

FOREIGN PATENT DOCUMENTS

RU           2461981         9/2012
WO       WO2017056349       4/2017

OTHER PUBLICATIONS

Huawei et al., "TS 23.502: Replacing information flows by UDM service presentation," SA WG2 Meeting #120, dated Mar. 27-31, 2017, 12 pages.

(Continued)

*Primary Examiner* — Dinh Nguyen
(74) *Attorney, Agent, or Firm* — Fish & Richardson P.C.

(57) ABSTRACT

In one embodiment of the present invention, a method for enabling a UDM (Unified Data Management) to perform a registration related procedure of an AMF (Access and Mobility Management Function) in a wireless communication system comprises the steps of: receiving, by the UDM, a message related to serving AMF registration of a UE, which includes access type information and ID (Identity) information, from a first AMF; transmitting, by the UDM, a deregistration related message to a second AMF when the second AMF exists, wherein the second AMF is registered as a serving AMF of the UE and related to the access type information.

13 Claims, 19 Drawing Sheets

Related U.S. Application Data

(60) Provisional application No. 62/501,055, filed on May 3, 2017, provisional application No. 62/491,191, filed on Apr. 27, 2017.

(51) Int. Cl.
*H04W 36/14* (2009.01)
*H04W 60/06* (2009.01)

(56) References Cited

U.S. PATENT DOCUMENTS

| | | | |
|---|---|---|---|
| 2017/0303259 A1* | 10/2017 | Lee | H04W 72/048 |
| 2019/0268895 A1* | 8/2019 | Keller | H04L 5/0032 |
| 2019/0394633 A1* | 12/2019 | Castellanos Zamora | H04W 60/04 |
| 2020/0059989 A1* | 2/2020 | Velev | H04W 76/32 |

OTHER PUBLICATIONS

Huawei et al., "Registration procedure," SA WG2 Meeting #118-BIS, dated Jan. 16-20, 2017, 9 pages.
CATT, "De-Registration procedure," SA WG2 Meeting #118-BIS, dated Jan. 16-20, 2017, 5 pages.
China Mobile, "23.502: Describe NF services provided by UDM," SA WG2 Meeting #82-120, dated Mar. 27-31, 2017 13 pages.
Huawei et al., "TS 23.501: Description of DNN," 3GPP TSG SA WG2 Meeting #120, dated Mar. 27-30, 2017, 3 pages.
Russian Notice of Allowance in Russian Application No. 2019134060, dated May 27, 2020, 21 pages (with English translation).

\* cited by examiner (a)

(b)

(a)

(b)

METHOD FOR PERFORMING A PROCEDURE RELATED TO AMF REGISTRATION BY UDM IN WIRELESS COMMUNICATION SYSTEM AND APPARATUS FOR SAME

CROSS-REFERENCE TO RELATED APPLICATIONS

This application is a continuation of U.S. application Ser. No. 16/064,942, filed on Jun. 21, 2018, which is a National Stage application under 35 U.S.C. § 371 of International Application No. PCT/KR2018/004885, filed on Apr. 26, 2018, which claims the benefit of U.S. Provisional Application No. 62/501,055, filed on May 3, 2017, and U.S. Provisional Application No. 62/491,191, filed on Apr. 27, 2017. The disclosures of the prior applications are incorporated by reference in their entirety.

TECHNICAL FIELD

The following description relates to a wireless communication system, and more particularly, to a method for enabling UDM (Unified Data Management) to perform a procedure related to registration of AMF (Access and Mobility Management Function) and a device therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

DISCLOSURE

Technical Problem

An object of the present invention is to provide a method for enabling a UDM to efficiently perform registration of AMF in a 5G mobile communication system.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In one embodiment of the present invention, a method for enabling a UDM (Unified Data Management) to perform a registration related procedure of an AMF (Access and Mobility Management Function) in a wireless communication system comprises the steps of: receiving, by the UDM, a message related to serving AMF registration of a UE, which includes access type information and ID (Identity) information, from a first AMF; transmitting, by the UDM, a deregistration related message to a second AMF when the second AMF exists, wherein the second AMF is registered as a serving AMF of the UE and related to the access type information.

In one embodiment of the present invention, a UDM (Unified Data Management) device for performing a registration related procedure of an AMF (Access and Mobility Management Function) in a wireless communication system comprises a transceiver; and a processor, wherein the processor allows the UDM to receive a message related to serving AMF registration of a UE, which includes access type information and ID (Identity) information, from a first AMF, and if a second AMF registered as a serving AMF of the UE, which corresponds to the access type information, exists, the UDM transmits a deregistration related message to the second AMF.

The UDM may store access type information related to the AMF and the ID information.

The UDM may receive a request message related to deletion of UE context from NF, and the request message related to deletion of the UE context may include access type information when the NF is the AMF.

If the UDM transmits the deregistration related message due to subscription withdrawn, it may indicate an access type of the deregistration related message.

If a message for requesting serving AMF information is received from the NF, the serving AMF information related to the access type may be transmitted to the NF, and the message for requesting serving AMF information may include access type information.

The method may further comprise the step of receiving a request for requesting to provide UE reachability information from the NF, wherein the request for requesting to provide UE reachability information may include access type information.

The UDM may be subscribed to a notification service for UE reachability event by AMF related to the access type.

If information indicating that the UE is reachable is received from the AMF related to the access type, the information indicating that the UE is reachable may be transmitted to the NF.

If the UE performs handover from a 5GS (5G system) to an EPS (Evolved Packet System), cancel location by the UDM and the HSS may be performed for AMF of which access type is 3GPP.

If the UE changes a 5GS to an EPS in an idle mode, a cancel location operation by the UDM may be performed for AMF of which access type is 3GPP.

Advantageous Effects

According to the present invention, a serving AMF and/or related information may be managed efficiently in a state that AMF may exist per access in respect of 3GPP and non-3GPP access.

It will be appreciated by persons skilled in the art that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

BEST MODE FOR CARRYING OUT THE INVENTION

Figure 1:
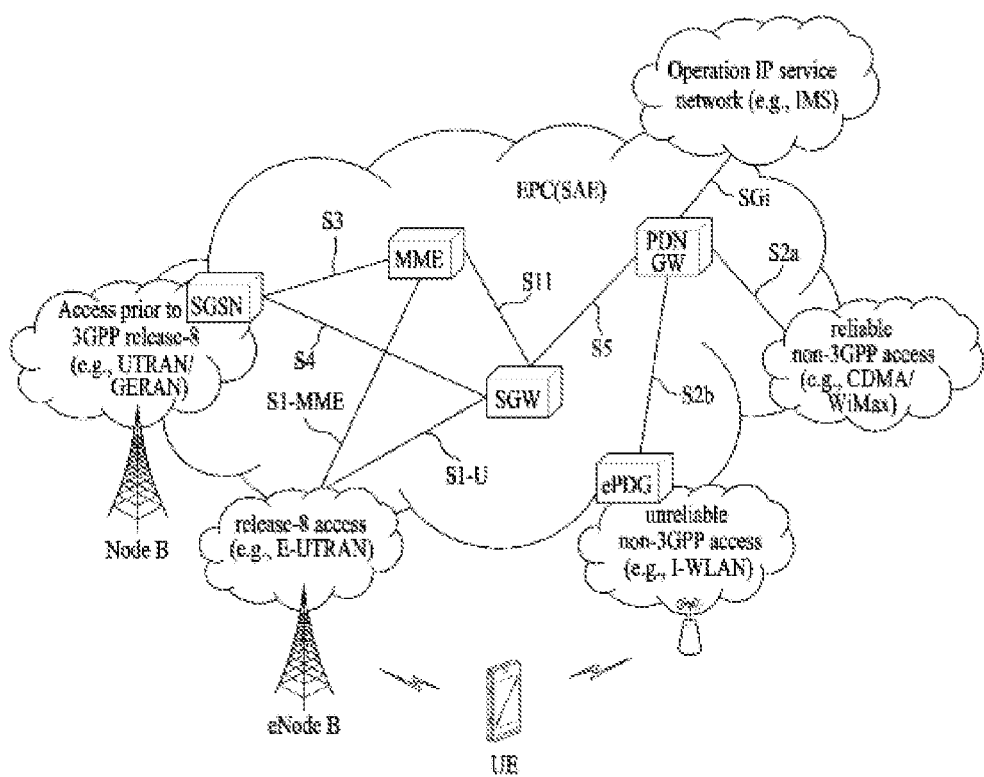
FIG. 1 is a diagram illustrating a brief structure of an evolved packet system (EPS) that includes an evolved packet core (EPC).

The embodiments below are combinations of components and features of the present invention in a prescribed form. Each component or feature may be considered as selective unless explicitly mentioned as otherwise. Each component or feature may be executed in a form that is not combined with other components and features. Further, some components and/or features may be combined to configure an embodiment of the present invention. The order of operations described in the embodiments of the present invention may be changed. Some components or features of an embodiment may be included in another embodiment or may be substituted with a corresponding component or feature of the present invention.

Specific terms used in the description below are provided to help an understanding of the present invention, and the use of such specific terms may be changed to another form within the scope of the technical concept of the present invention.

In some cases, in order to avoid obscurity of the concept of the present invention, a known structure and apparatus may be omitted, or a block diagram centering on core functions of each structure or apparatus may be used. Moreover, the same reference numerals are used for the same components throughout the present specification.

The embodiments of the present invention may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present invention in the embodiments of the present invention may be supported by the above documents. Furthermore, all terms disclosed in the present document may be described according to the above standard documents.

The technolgy below may be used for various wireless communciation systems. For clarity, the description below centers on 3GPP LTE and 3GPP LTE-A, by which the technical idea of the present invention is non-limited.

Terms used in the present document are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MIMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data are exchanged through a direct data path without through a 3GPP core network (for example, EPC).

EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also based on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |

TABLE 1-continued

| Reference point | Description |
| --- | --- |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
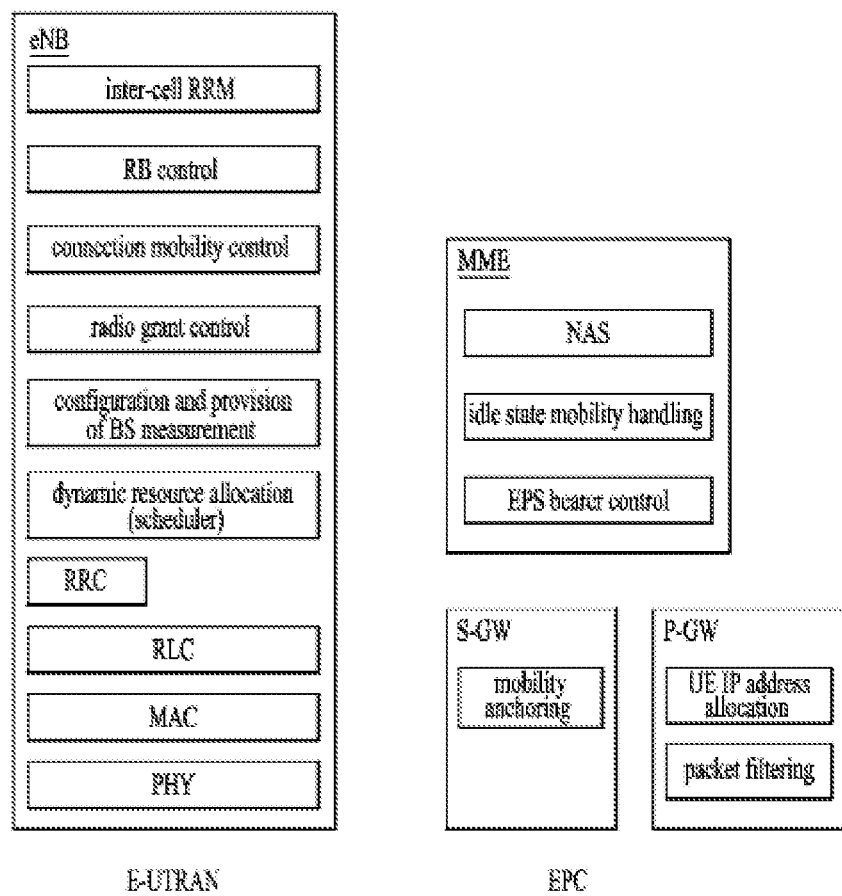
FIG. 2 is an exemplary diagram illustrating an architecture of a general E-UTRAN and a general EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
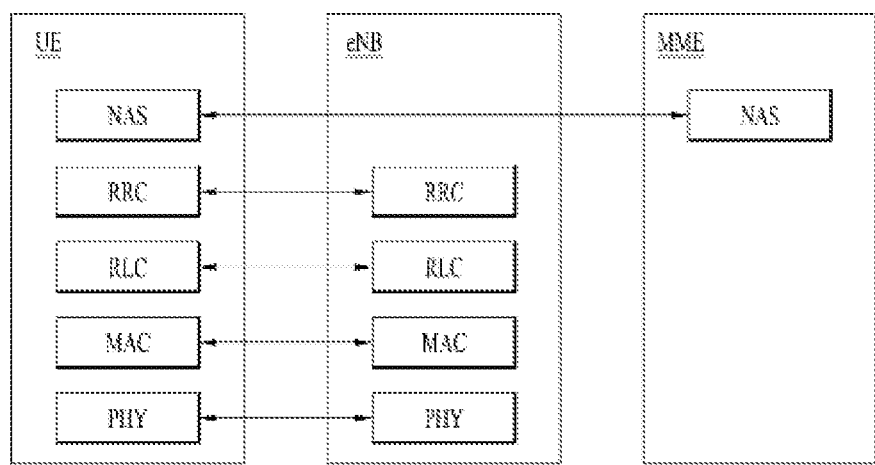
FIG. 3 is an exemplary diagram illustrating a structure of a radio interface protocol on a control plane.
Figure 4:
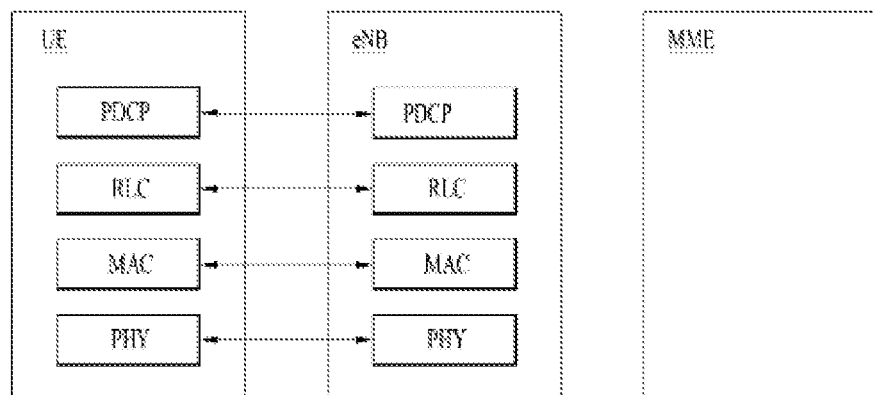
FIG. 4 is an exemplary diagram illustrating a structure of a radio interface protocol on a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
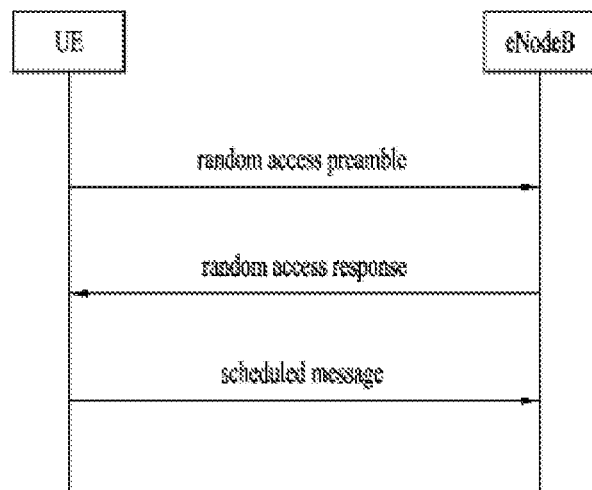
FIG. 5 is a flow chart illustrating a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
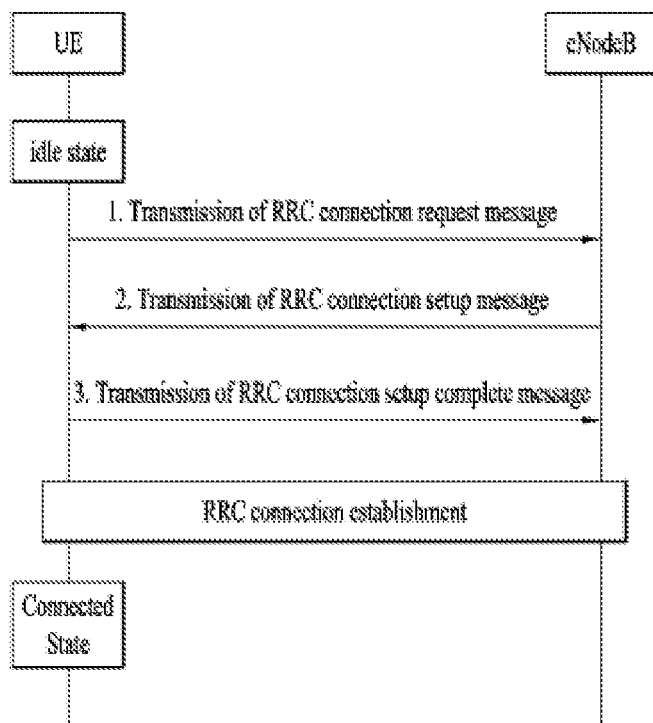
FIG. 6 is a diagram illustrating a connection procedure in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNode B and transition to the RRC connected mode.

Figure 7:
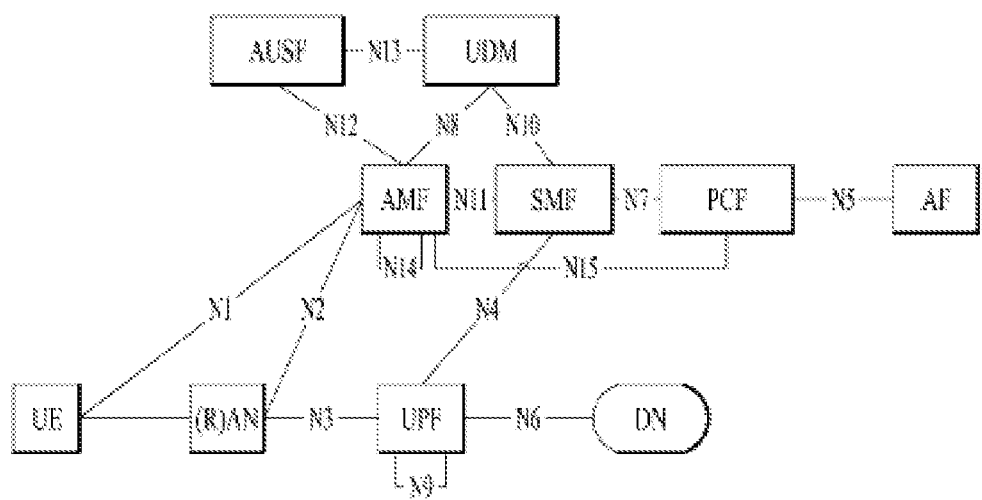
FIG. 7 is a diagram illustrating a 5G system.

In the legacy EPC, MME is categorized into AMF (Core Access and Mobility Management Function) and SMF (session Management Function) in a Next Generation system (or 5G core network (CN)). Therefore, NAS interaction and MM (Mobility Management) with the UE are performed by the AMF, and SM (Session Management) is performed by the SMF. Also, the SMF manages a UPF (User plane Function) which is a gateway having a user-plane function, that is, for routing user traffic. In this case, a control-plane portion of S-GW and P-GW in the legacy EPC may be managed by the SMF, and a user-plane portion may be managed by the UPF. For routing of user traffic, one or more UPFs may exist between RAN and DN (Data Network). That is, the legacy EPC may be configured in 5G as illustrated in FIG. 7. Also, as a concept corresponding to PDN connection in the legacy EPS, a PDU (Protocol Data Unit) session is defined in the 5G system. The PDU session refers to association between a UE, which provides PDU connectivity services of Ethernet type or unstructured type as well as IP type, and a DN. In addition, a UDM (Unified Data Management) performs a function corresponding to HSS of EPC, and PCF (Policy Control Function) performs a function corresponding to PCRF of the EPC. To satisfy requirements of the 5G system, the functions may be provided in an enlarged type. N1 is a reference point for a control plane between 5G UE and AMF, N2 is a reference point for a control plane between 5G (R)AN and AMF, and N3 is a reference point for a user plane between 5G (R)AN and UPF. Also, N4 is a reference point between SMF and UPF, N5 is a reference point between PCF and application function, and N6 is a reference point between UPF and a data network. The data network may be a public or private data network outside a mobile communication provider, or may be a mobile communication provider data network. N7 is a reference point between SMF and PCF. Details of the 5G system architecture, each function and each interface follows TS 23.501. Particularly, the 5G system (that is, next generation system) should support non-3GPP access, and thus details such as architecture for supporting non-3GPP access and network element are described in clause 4.2.7 of TS 23.501v0.2.0. A main example of non-3GPP access may include WLAN access that may include a trusted WLAN and an untrusted WLAN.

Figure 8:
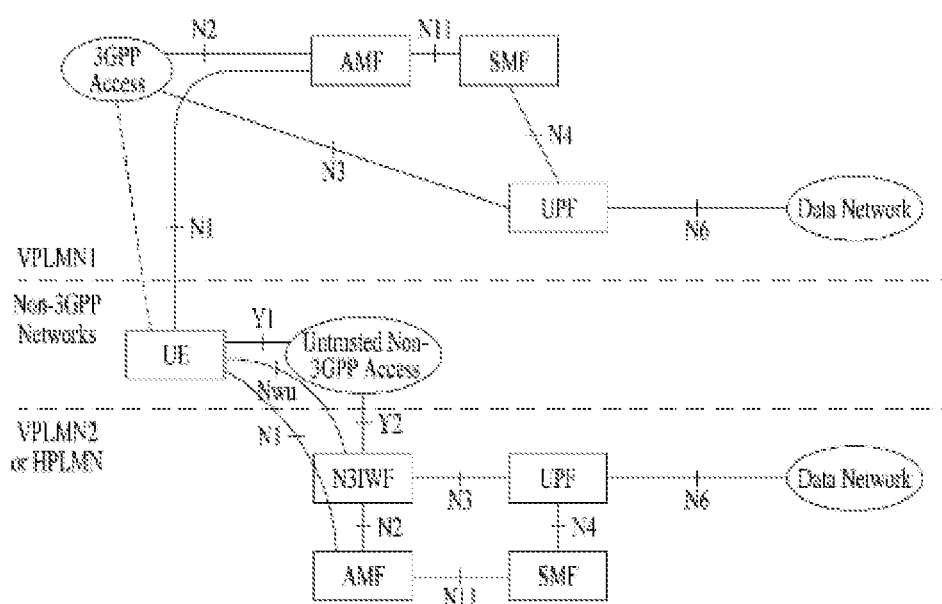
FIG. 8 illustrates a Non-Roaming NextGe Architecture.

An architecture which includes various types of non-3GPP accesses is suggested in TS 23.501. For example, AMF (that is, serving AMF for 3GPP access of UE) for 3GPP access may be different from AMF (that is, serving AMF for non-3GPP access of UE) for non-3GPP access as shown in FIG. 8. This is because that PLMNs to/in which the respective accesses belong/are located are different from each other.

If the number of serving AMFs for the UE is 2, UDM which should store the serving AMFs cannot identify an access type of the corresponding serving AMF in case of a serving node registration request (for example, (Nudm-_Serving NF_Registration service) operation in clause 5.2.3.1 of TS 23.502v0.3.0) from the AMF. Therefore, if the serving AMF for the UE already exists, the UDM cannot determine whether to replace the serving AMF or add serving AFM for another access. In addition, when a random network entity queries information on the serving AMF of the UE for the UDM or requests the UDM of operation to the serving AMF, a problem occurs in that the UDM cannot determine an access type of the AMF.

Hereinafter, a method for efficiently managing a serving AMF or a method for managing information on the serving AMF in a state that AMF may exist per access in respect of 3GPP and non-3GPP access will be described.

Embodiment

The UDM according to one embodiment of the present invention may receive a message related to serving AMF registration of the UE from a first AMF in a procedure related to a registration of AMF (Access and Mobility Management Function), wherein the message includes access type information and ID (identity) information. The UDM stores the access type information on the AMF and the ID information. If a second AMF registered as a serving AMF of the UE, which corresponds to the access type information, exists, the UDM may transmit a deregistration related message to a second AMF. The access type may include 3GPP access and non-3GPP access. (The access type information related to the AMF and the ID information may be stored for both of the case that the second AMF registered as the serving AMF of the UE, which corresponds to the access type information, exists and the case that the second AMF does not exist.)

That is, the message transmitted to register the AMF as the serving AMF includes ID of the AMF, and notifies the UDM of information indicating an access type of the AMF. The UDM stores ID of the AMF together with access type information associated with AMF ID unlike the related art in which the UDM stores only ID of the AMF. In this case, the UDM may manage the AMF per access type, and if the AMF registered as the serving AMF of the UE, which is the same as the received access type, already exists, the UDM deregisters the AMF which is previously registered. AMF ID included in the message transmitted from the AMF may be one or more of AMF address, AMF NF (Network Function) ID, AMF identifier, AMF IP address, and FQDN of AMF, and may include NF type information. Alternatively, AMF ID may be GUAMI (Globally Unique AMF Identifier) type. This may be applied to AMF ID included in a message transmitted from another NF as well as a message transmitted from the AMF. Also, this may be applied to NF ID included in the message transmitted from the NF. ID of AMF, which is stored by the UDM, may be AMF ID included in the message transmitted from the AMF, or information of a part of the AMF ID, or may be ID modified in the form understood by the UDM. This may also be applied to ID of NF, which is stored by the UDM, on the whole of the present invention.

Figure 9:
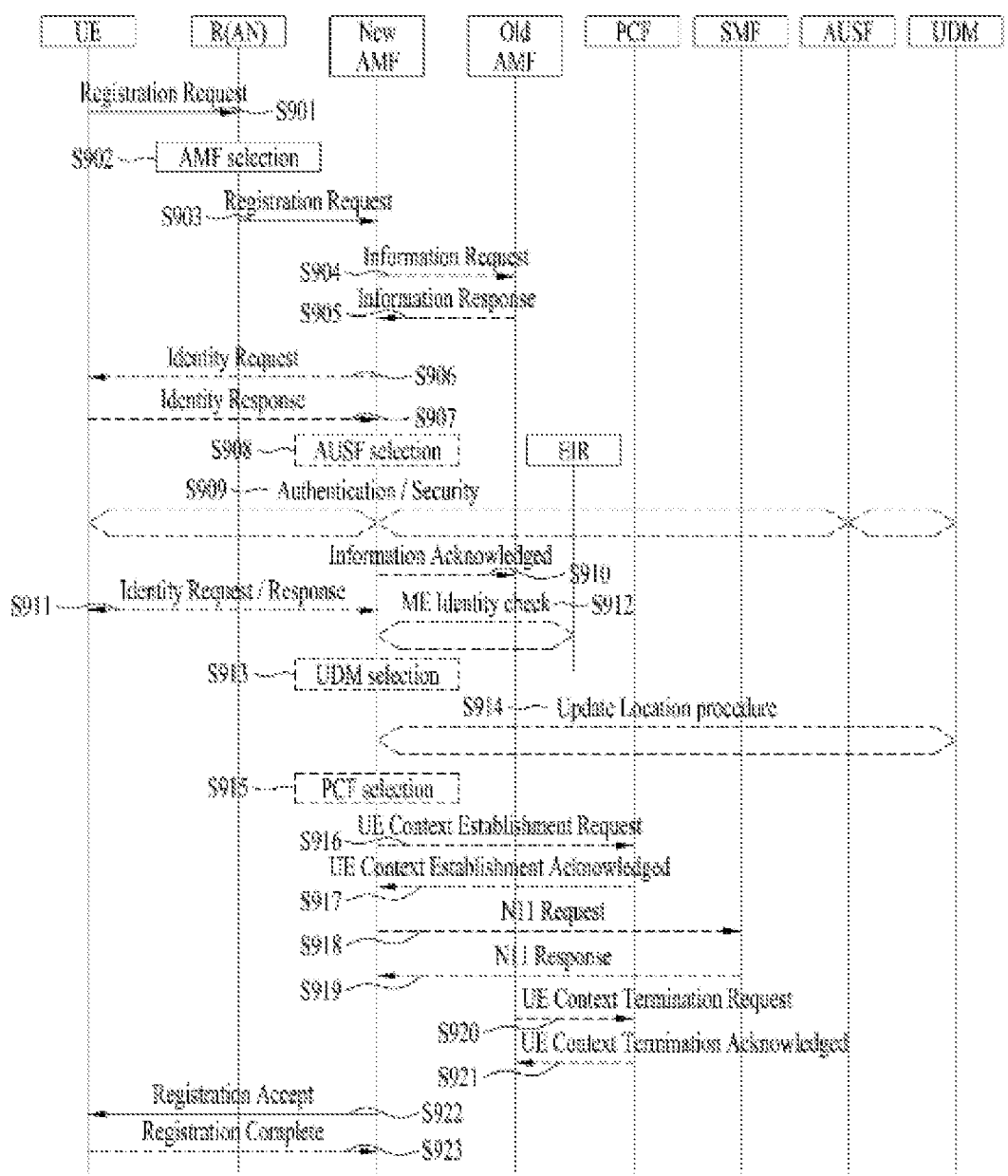
FIGS. 9 to 21 are diagrams illustrating examples of a detailed procedure according to the embodiments of the present invention.

The aforementioned operation will be described in detail through a general registration procedure with reference to FIG. 9. A general registration procedure of 3GPP TS 23.502v0.3.0 is shown in FIG. 9. In FIG. 9, step S901, which is related to transmission of a registration request of the UE, to step S913 and details of steps S915 to S923 will be replaced with the description of general registration of 3GPP TS 23.502v0.3.0.

In step S914, if the AMF is changed due to the last registration procedure, if there is no valid subscription context for the UE in the AMF, or if the UE provides SUPI (Subscription Permanent Identifier) which does not refer to valid context in the AMF, a new AMF starts Update Location procedure. The new AMF provides the UDM with an access type which is served. If AMF related to the access type exists, it includes that the UDM initiates cancel location to this AMF, that is, old AMF. The UDM stores the access type related to the serving AMF (information) together with the serving AMF(information). (Details of the operation that the new AMF provides the UDM with access type information and related UDM operation will be understood with reference to the description made in FIG. 11.) The old AMF notifies deletes MM context and notifies all possible and associated SMFs of the deleted MM context, and the new AMF generates MM context for the UE after obtaining AMF related subscription data from the UDM. At this time, the old AMF may delete MM context related to a 3GPP access and report the deleted MM context to SMF(s) for PDU session on a 3GPP access. The new AMF may generate MM context for 3GPP access. The old AMF and the new AMF recognize that access type is a 3GPP access. This is because that access acquired from the UDM or served by the UDM is only a 3GPP access.

In this procedure, if the UE is registered in the same AMF already registered in a non-3GPP access, (for example, UE is registered over a non-3GPP access and initiates this registration procedure to add a 3GPP access), the UE should transmit AMF Notify Request (AMF ID, access type) message to the UDM. The access type is set to "3GPP access", and Notify Request is to register a serving AMF for a 3GPP access in the UDM. The UDM transmits a Notify Response message to the AMF. As described above, although the AMF may notify the UDM addition of a new access through the Notify Request message, various messages such as Location Update Request message may be used.

Figure 10:
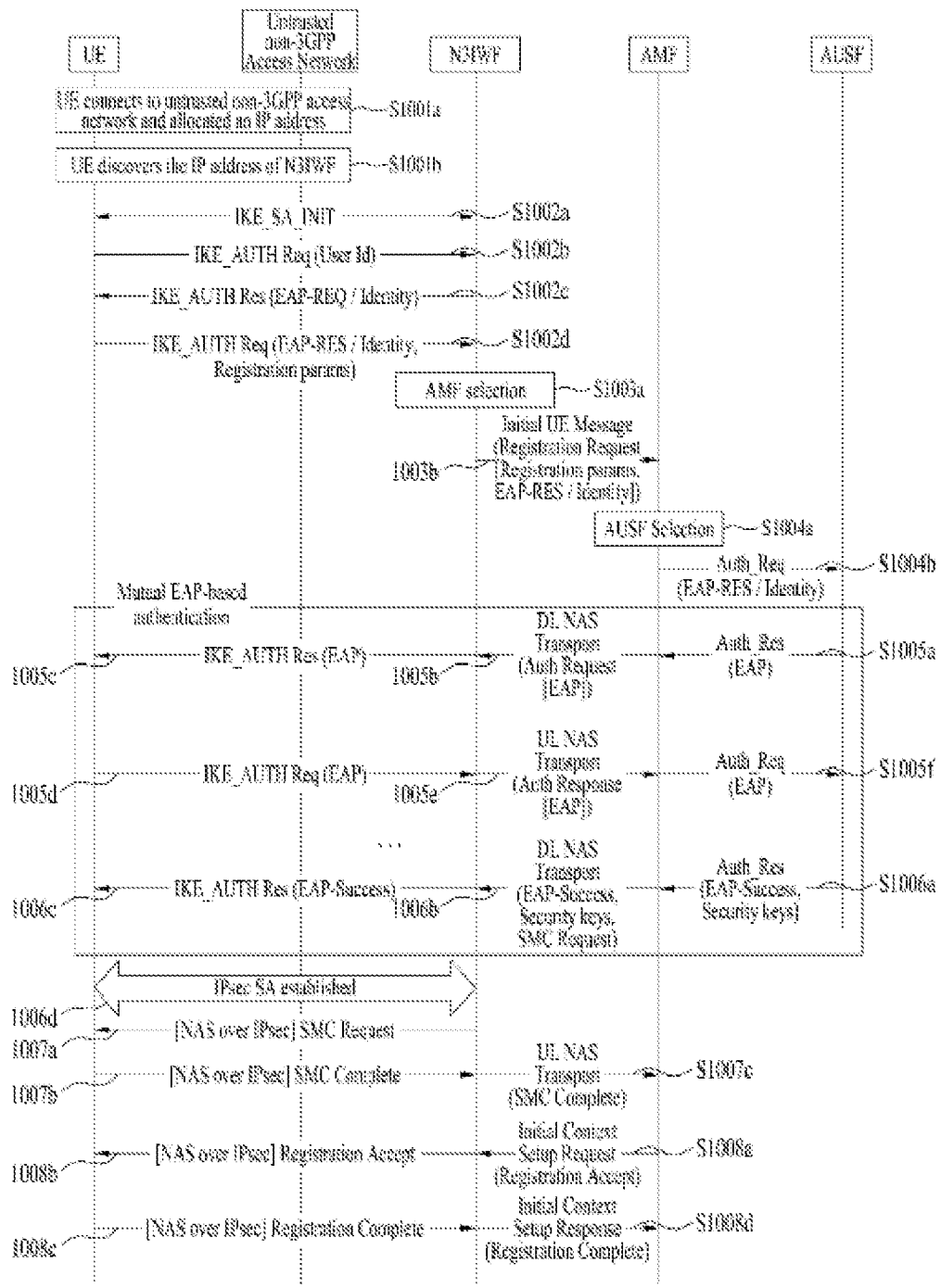

A registration procedure through an untrusted non-3GPP access is shown in FIG. 10. After step S1007, the steps S913 and S914 of FIG. 9 are performed. Although the description of FIG. 9 is based on that the access type is a 3GPP access, this description will be given based on that the access type is a non-3GPP access. The steps S913 and S914 may be performed prior to the step S1007. In addition, detailed description of each procedure in FIG. 10 will be replaced with the description of Registration via Untrusted non-3GPP Access of 3GPP TS 23.502v0.3.0.

Figure 11:
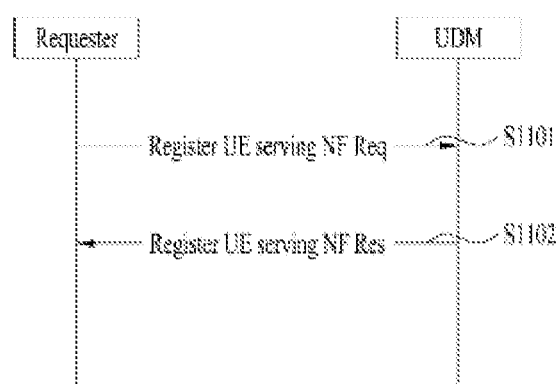

A Service/service operation information flow of Nudm_Serving NF_Registration service is shown in FIG. 11. In this case, the Nudm_Serving NF_Registration service may be specified as listed in Table 2 below. In the following description, the scope of the present invention is not limited to a specific name.

TABLE 2

Service or service operation name: Nudm_Serving NF_Registration
Description: Register UE's serving NF on the UDM
Known NF Consumers: AMF, SMF, SMSF
Concurrent use: No.
Pre-requisite conditions: No
Post conditions: UDM stores the Requester NF ID in the UE context.
Inputs, Required: Requester NF ID, SUPI.
Inputs, Optional: subscription data retrieval indication.
Outputs, Required: Result indication.
Outputs, Optional: UE subscription data is retrieved by the Requester NF ID, if the subscription data retrieval indication is included.

Referring to FIG. 11, in step S1101, a Requester NF desires to be registered in the UDM as a serving NF of the UE. The Requester NF transmits a Register UE serving NF Request (SUPI, NF ID) message to the UDM. NF ID indicates NF type and ID of the serving NF. Selectively, in accordance with NF type of the Requester, the request message may include additional information stored in the UDM. For example, if the NF is SMF, the NF type may include related APN.

If the type of the Requester is AMF, the Request message includes access type (for example, "3GPP access" or "Non-3GPP access") stored together with AMF (information) in the UDM.

The AMF may perform the step S1101 per access type. For example, if UE #1 is registered in AMF #1 through the 3GPP access, the AMF #1 transmits the Request message, which includes access type="3GPP access", to the UDM. Afterwards, if the UE #1 is registered in the AMF #1 through the non-3GPP access, the AMF #1 transmits the Request message, which includes access type="Non-3GPP access", to the UDM. For another example, if UE #2 is registered in AMF #2 through the 3GPP access, the AMF #2 transmits the Request message, which includes access type="3GPP access", to the UDM. Afterwards, if the UE #2 is registered in AMF #3 through the non-3GPP access, the AMF #3 transmits the Request message, which includes access type="Non-3GPP access", to the UDM.

Although the above description is given based on that the access type information is "3GPP access" or "Non-3GPP access", the access type information may be expressed in the form of various levels/formats. For example, the 3GPP access may be expressed as NG-RAN (or NR) or E-UTRAN (or LTE). Also, the 3GPP access may be expressed as its detailed RAN. The non-3GPP access may be expressed as an untrusted non-3GPP access, a trusted non-3GPP access, WLAN, etc. Also, the non-3GPP access may be expressed as its detailed access. Also, the access type may indicate all access types such as "All accesses" or "Both accesses". In this way, if the access type indicates all access types and the step S1101 is performed, the AMF may delay the step S1101 until the AMF recognizes that the AMF is a serving AMF for all access types. Also, the access type information may be indicated implicitly. For example, RAT type may be inferred through location information (Cell ID, SSID of WLAN AP, etc.) of the UE. Also, the access type information may be construed as RAT type information. Description and operation related to the access type may be applied to the present invention as they are, or may be applied thereto by modification.

The AMF may include access type information in the Request message for all UEs (that is, always). Alternatively, the AMF may include access type information in the Request message if one or more of the following conditions are fulfilled. This is applied to the present invention.

i) The case that the UE may receive a service through non-3GPP access (or WLAN).

ii) The case that the UE may perform handover to non-3GPP access (or WLAN).

iii) The case that PLMN in/to which AMF is located/belongs does not support non-3GPP access (or WLAN).

iv) The case that PLMN in/to which AMF is located/belongs does not support/include N3IWF.

The case that the access type served by the AMF is the 3GPP access may not include the access type information. In this case, the UDM may regard that associated access of the AMF is the 3GPP access. Also, in this case, since the access type indicates that the access type is only the non-3GPP access, flag (or bit) is given to 1 or Yes or Set, whereby it may indicate that the AMF serves the non-3GPP access. If the access type information includes flag, it may indicate that the AMF serves the non-3GPP access. (For example, flag name is given to N3GPP Flag). This is applied to the present invention.

Optionally if the access type information includes subscription data retrieval indication, the Requester NF requests the UDM to return UE subscription data related to the NF type from the response message. This indication is reported implicitly by (UDM Subscription Data_UpdateNotification, see FIG. 18) when data is not changed or synchronized any more.

When the Requester NF transmits a Register UE serving NF Request message to the UDM, it implicitly notifies change (for example, "Nudm_Serving NF_ChangeNotification" and "Nudm_Subscription Data_UpdateNotification" services) of NF ID. Subscription to this notification service may be subscription to the corresponding access type.

In step S1102, the UDM stores a registered serving NF in UE context. NF type related to subscription data returns to the Requester NF if subscription data retrieval indication is included in the request message.

If the registered serving NF is the AMF, the UDM stores the associated access type together with the serving NF. If the AMF related to the associated access type exists in the UDM with respect to the UE, the UDM replaces the existing AMF with the new AMF, that is, Requester NF. In this case, the UDM may additionally transmit a cancel location message to the existing AMF. Finally, if the AMF for the associated access type does not exist in the UDM, the UDM stores new AMF information (the Requester NF with the access type).

Figure 12:
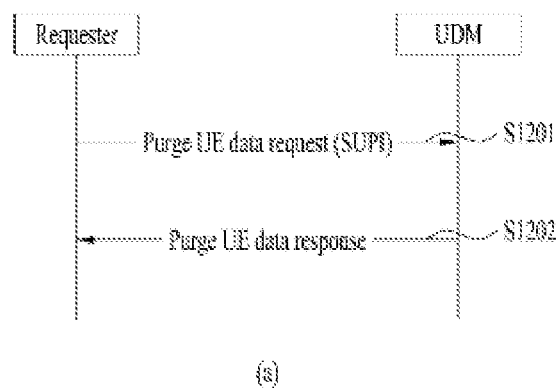
Figure 12:
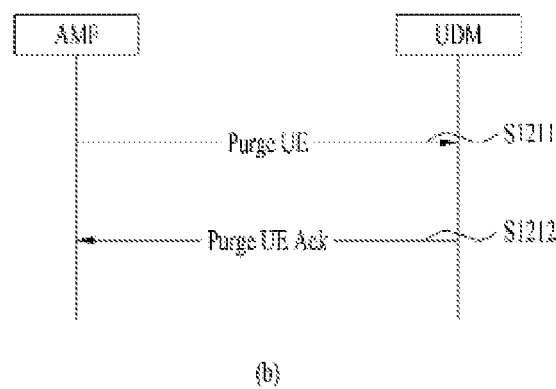

Meanwhile, if the UDM receives a request message related to deletion of UE context from the NF and the NF is AMF, the request message related to deletion of the UE context may include access type information. In this regard, a Service/service operation information flow of Nudm_Subscriber Data_Purge service is shown in FIG. 12(a).

In step S1201, the Requester NF transmits a Purge UE data request (SUPI) message to the UDM. This is a request for allowing the UDM to delete the stored Requester NF from the UE context. When the Requester NF transmits the Purge UE data request message, an associated access type of the NF may be included in this message. The associated access type may be included in the message only when the NF is the AMF. Also, the access type information may be included in the message only in case of the non-3GPP access.

In step S1202, the UDM removes the Requester NF from the UE context and responds to the requester NF as a Purge UE response. Afterwards, the UDM does not transmit subscription data update notifications to the requester any more. The UDM deletes the Requester NF from the UE context with respect to access type related to the access type information, that is, requested access type (or access type regarded to be requested) on the basis of the access type information included or not included in the request message. At this time, the access type information may be included in the response.

In the aforementioned description, Nudm_Subscriber Data_Purge may be specified as listed in Table 3 below.

TABLE 3

Service or service operation name: Nudm_ Subscriber Data_ Purge
Description: UDM deletes the information related to the Requester NF in the UE context.
Known NF Consumers: AMF, SMF, SMSF
Concurrent use: No.
Pre-requisite conditions: None
Post conditions: UDM deletes the information related to the Requester NF in the UE context.
Inputs, Required: SUPI
Inputs, Optional: None
Outputs, Required: Result Indication.
Outputs, Optional: None Meanwhile, whenever a user profile is changed in the UDM, and whenever the change affects a user profile of the AMF, the UDM notifies the AMF affected by the change of the changes through a "Subscriber Data Update Notification to AMF" procedure. In this case, the AMF adds or changes the user profile. When the UDM performs the Subscriber Data Update Notification to AMF operation for the AMF, information indicating an access type of a user profile change may be provided to the AMF. If AMF which serves 3GPP access is different from AMF which serves non-3GPP access, the UDM performs the Subscriber Data Update Notification to AMF operation for the AMF which is serving access related to the user profile change. The "Subscriber Data Update Notification" service is used to allow the UDM to update subscriber data stored in the AMF.

The AMF initiates a proper operation in accordance with the changed subscriber data. For example, if the updated subscription data indicates that the UE is not allowed for roaming within a network, the AMF initiates an AMF initiated De-registration procedure. If the AMF is serving one access even there is no information, the AMF performs a proper operation related to the changed subscriber information with respect to the access on the basis of the information on the access type provided from the UDM.

A Purge of subscriber data from AMF procedure is shown in FIG. 12(b). In step S1211, after MM context and subscriber data of a de-registered UE are removed, the AMF transmits a Purge UE (SUPI) message to the UDM. When the AMF transmits the Purge UE message to the UDM, an access type of the purge UE message may be included in this message explicitly or implicitly. If the access type of the purge UE message is included in the message explicitly, the access type may be included in the message in the form of 3GPP access, non-3GPP access, and information indicating two accesses. If the access type of the purge UE message is included in the message implicitly, the access type may be notified by including location information of the UE. For example, information such as cell ID may be construed as 3GPP access, and information such as SSID of WLAN AP may be construed as non-3GPP access. If the two accesses are purged, location information on the two accesses may be included in the corresponding information.

In step S1212, the UDM sets a UE Purged flag and responds through a Purge UE Ack message. The UDM may manage the UE Purged flag per access type. Therefore, the UDM sets the UE Purged flag related to the purged access on the basis of information provided by the AMF, information on access served by the AMF, etc.

Figure 13:
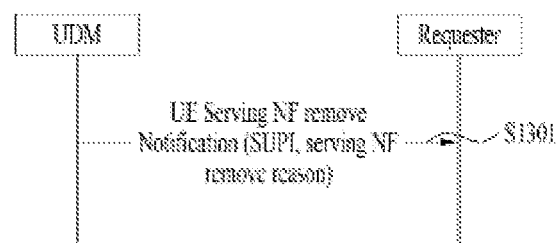

Service/service operation information flow of Nudm_Serving NF_RemoveNotification service is shown in FIG. 13. In step S1301, if the UDM detects that the UE serving NF is removed (for example, new AMF is registered in UDM), the UDM notifies the Requester NF previously subscribed to the Nudm_Serving NF_RemoveNotification service of the detected result through UE Serving NF Remove Notification (SUPI, serving NF remove reason). The provided serving NF remove reason indicates why the NF is removed (for example, update due to a new serving NF is registered). The Requester NF may additionally perform a related process. (For example, remove the UE context it maintains when the UE is not served by the requester). The UDM may perform the above operation to be suitable for access type served by the AMF. That is, if the Requester NF is subscribed to Nudm_Serving NF_RemoveNotification service for a specific access type, and when the UE serving NF related to the corresponding access type is removed, this may be notified to the Requester NF. At this time, the associated access type of the serving NF may be added to the UE Serving NF Remove Notification message.

In the aforementioned description, Nudm_Serving NF_RemoveNotification may be specified as listed in Table 4 below.

TABLE 4

Service or service operation name:
Nudm_Serving NF_RemoveNotification
Description: UDM notifies the Requester NF, which has subscribed the remove notification before, the Requester NF ID has been removed from the UDM due to a new serving NF for the UE registered in the UDM.
Known NF Consumers: AMF, SMF, SMSF
Concurrent use: No.
Pre-requisite conditions: UDM detects UE's serving NF is removed
Post conditions: None.
Inputs, Required: Serving NF registered in UDM implicitly/explicitly
Inputs, Optional: None.
Outputs, Required: SUPI, serving NF change reason SUPI, serving NF removal reason.
Outputs, Optional: None Meanwhile, if the UDM transmits a deregistration related message due to subscription withdrawn, the UDM may indicate an access type of the deregistration related message.

Figure 14:
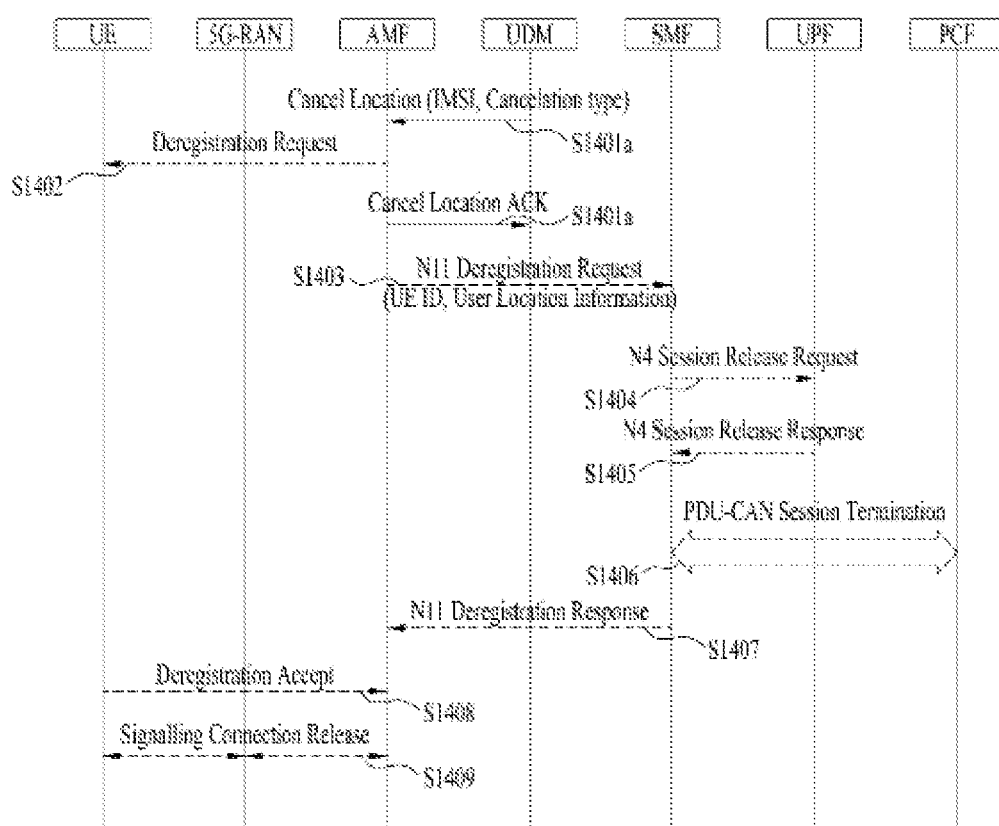

The above-described operation will be described through UDM initiated Deregistration procedure with reference to FIG. 14. The Deregistration procedure of 3GPP TS 23.502v0.3.0 is shown in FIG. 14. In FIG. 14, details after step S1403 will be replaced with the description of Deregistration procedures of 3GPP TS 23.502v0.3.0.

In step S1401a, if the UDM desires to immediately delete MM contexts and PDU sessions of subscriber, the UDM should transmit a Cancel Location (SUPI (Subscriber Permanent Identifier), Cancellation Type) message together with a cancellation type for which Subscription Withdrawn is configured with respect to the registered AMF.

When the UDM transmits the Cancel Location message, the UDM may add an access type of a cancel request. The UDM may add the above information only if the AMF is serving both of 3GPP access and non-3GPP access. If the AMF is serving the two accesses despite that the above information is not included therein, the AMF may regard that i) a cancel request for all accesses served by the AMF is transmitted from the corresponding UE, ii) a cancel request for only 3GPP access is transmitted, and iii) a cancel request for only non-3GPP access is transmitted. This may be regarded as i), ii) or iii) on the basis of information such as local configuration, operator policy, etc. included in the AMF.

If a serving AMF for 3GPP access is different from a serving AMF for non-3GPP access, the UDM transmits the Cancel Location message to the AMF related to an access of which cancellation should be requested. If the two accesses should be cancelled (this may be construed that cancellation should be performed regardless of access), Cancel Location message should be transmitted to each of two AMFs. If there is information indicating an access type of a cancel request, the AMF may determine the access type of the cancel request on the basis of the information. Or, even if there is no information indicating an access type of a cancel request, since the AMF knows an access type served by itself, the AMF may determine the access type of the cancel request.

In step S1402, if Cancellation Type is Subscription Withdrawn, AMF having active UE context notifies a UE which is in CM-CONNECTED state of the deregistered fact by transmitting Deregistration Request (Deregistration Type) message to the UE. If Cancel Location message includes a flag indicating that re-attach is required, the AMF should configure a Deregister Type to indicate that re-attach is required. If the UE is in CM-IDLE state, the AMF pages the UE. As described above, since the AMF may recognize the access type of which cancellation is requested or the access type determined to be cancelled, the AMF performs a deregistration operation of the UE for the corresponding access. If deregistration should be performed for both of 3GPP access and non-3GPP access, the AMF may explicitly or implicitly notify that deregistration should be performed for two accesses while transmitting Deregistration Request to one access.

Meanwhile, if a message for requesting serving AMF information is received from the NF, the UDM transmits serving AMF information related to the access type to the NF, wherein the message for requesting the serving AMF information may include access type information.

Figure 15:
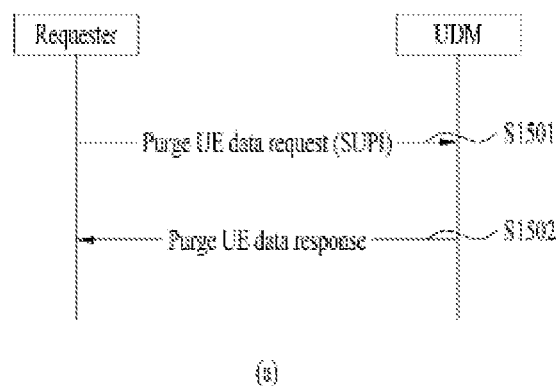
Figure 15:
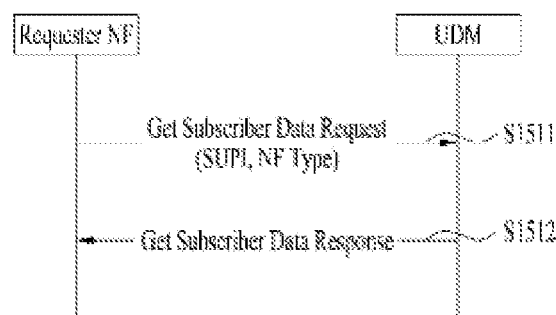

In this regard, Service/service operation information flow of Nudm_Serving NF_Get service is shown in FIG. 15(a).

In step S1501, NF consumer transmits a Get UE Serving NF Request (UE ID, NF type) message to the UDM to get a UE serving NF. The NF type indicates which type of NF (for example, AMF, SMF, etc.) has been queried. When the NF consumer (that is, Requester) transmits the Get UE Serving NF Request message, the NF consumer may include associated access type information of the serving NF in this message. This access type information may be included in the corresponding message only if the NF type is AMF. Also, the access type information may be included in the corresponding message only in case of non-3GPP access.

In step S1502, the UDM verifies whether the Requester NF is allowed to access required subscriber serving NF data. If so, the UDM provides the requester with required subscriber serving NF (for example, FQDN or address of serving NF). The UDM provides serving NF of the UE with respect to access type related to the access type information, that is, requested access type (or access type regarded to be requested) on the basis of the access type information included or not included in the request message. At this time, the access type information may be included in the response.

The UDM may unconditionally provide AMF ID related to 3GPP access to the response if the request message of step S1501 is received. This may be construed that it is assumed that details on the access type information suggested as above are not added.

In this case, Nudm_Serving NF_Get service may be specified as listed in Table 5 below. In the following description, the scope of the present invention is not limited to a specific name, etc.

TABLE 5

Service or service operation name: Nudm_ Serving NF_ Get
Description: The Requester NF request the UDM to get the serving NF of the UE.
Known NF Consumers: NEF
Concurrent use: No.
Pre-requisite conditions: None
Post conditions: None.
Inputs, Required: UE ID, NF Type
Inputs, Optional: None
Outputs, Required: SUPI, Serving NF ID of the NF type requested by Requester NF.
Outputs, Optional: None Service/service operation information flow of Nudm_Subscriber Data_Get service is shown in FIG. 15(b).

In step S1511, the Requester NF requests the UDM to corresponding subscriber data while providing UE ID (for example, SUPI) and NF type information.

In step S1512, if the NF type is SMF, DNN is also included. When the Requester NF transmits the Get Subscriber Data Request message, the Requester NF may include access type information in this message. The access type information may be included in the corresponding message only if the NF is AMF. Also, the access type information may be included in the corresponding message only in case of non-3GPP access.

In step S1512, the UDM checks UE ID and NF type to retrieve the corresponding subscriber data and provide the data to the Requester NF. If the Requester NF is SMF, the subscriber data include PDU type(s), authorized SSC mode(s), Default QoS profile, etc., for example. The UDM provides the Requester NF with subscriber information on access type related to the access type information, that is, requested access type (or access type regarded to be requested) on the basis of the access type information included or not included in the request message. At this time, the access type information may be included in the response.

In this case, Nudm_Subscriber Data_Get may be specified as listed in Table 6 below. In the following description, the scope of the present invention is not limited to a specific name, etc.

TABLE 6

Service name: Nudm_Subscriber_Data Get
Description: Requester NF gets the subscriber data from UDM
Known NF Consumers: SMF, SMSF, AMF, AUSF
Concurrent use: No.
Pre-requisite conditions: None
Post conditions: None
Inputs, Required: SUPI, NF type.
Inputs, Optional: DNN if the NF type is SMF.
Outputs, Required: The Requester NF gets the requested subscription data.
Outputs, Optional: None Meanwhile, the UDM may receive a request for requesting to provide UE reachability information from the NF, wherein the request for requesting to provide the UE reachability information may include access type information. The UDM may be subscribed to a notification service for UE reachability event to the AMF related to the access type. If information indicating that the UE is reachable is received from the AMF related to the access type, the UDM may transmit the information indicating that the UE is reachable, to the NF.

Figure 16:
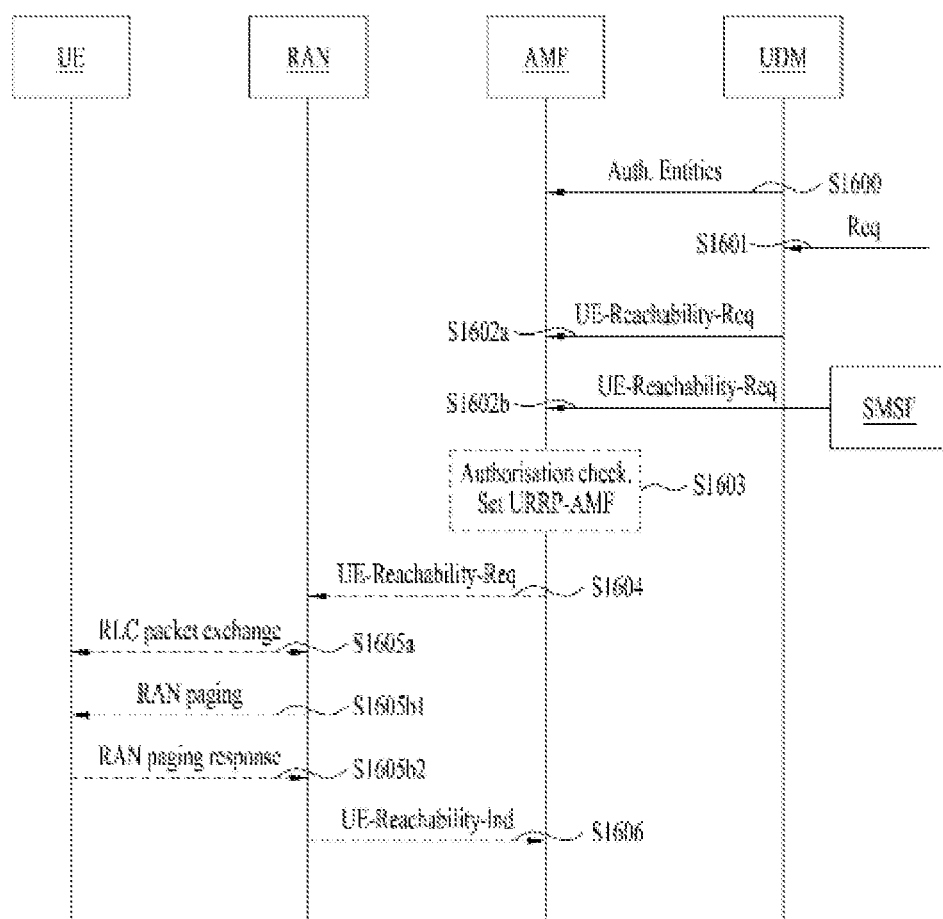

The above-described operation will be described in detail through Reachability procedures with reference to FIG. 16. The Reachability procedures of 3GPP TS 23.502v0.3.0 is shown in FIG. 16.

In step S1600, in the registration procedure or the subscription update procedure, the UDM notifies the AMF of identifies (for example, FQDNs) of network entities in which notification request for reachability of the UE is granted. The UDM and the SMSF are basically granted.

When the UDM notifies the AMF of network entity (entities) which has (have) requested UE reachability notification, the UDM may provide an access type desired by each network entity to get a reachability notification service. The access type may be determined based on associated information provided from each network entity, information (local configuration, operator policy, etc.) configured in the UDM, type/property of the entity (e.g., service provided by the entity), and subscriber information of the UE. The UDM may provide the above information only if the AMF is serving both of 3GPP access and non-3GPP access. If the AMF is serving the two accesses despite that the above information is not included therein, the AMF may regard that i) a reachability notification request for all accesses served by the AMF is transmitted from the corresponding UE, ii) a reachability notification request for only 3GPP access is transmitted, and iii) a reachability notification request for only non-3GPP access is transmitted. This may be regarded as i), ii) or iii) on the basis of local configuration, operator policy, subscriber information of the UE, etc. included in the AMF.

If a serving AMF for 3GPP access is different from a serving AMF for non-3GPP access, the UDM transmits a message indicating the network entity to the AMF related to an access of which UE reachability notification should be requested. If there is information indicating an access type of a reachability notification request, the AMF may determine the access type of the reachability notification request on the basis of the information. Or, even if there is no information indicating an access type of a reachability notification request, since the AMF knows an access type served by itself, the AMF may determine the access type of the reachability notification request.

The AMF may store access type information indicating an access type of each entity which has requested a UE reachability notification, together with entity ID.

In step S1601, if a service-related entity requests the UDM to provide a UE reachability notification, the UDM checks that the entity has been granted to perform the request on subscriber. If the entity has not been granted, the request is rejected (for example, if the requesting entity is recognized as being a valid entity, but not authorized for that subscriber) or the request is disregarded. (For example, if the requesting entity is not recognized). A proper O&M report is generated.

When the service-related entity requests the UDM of UE reachability notification, an access type of a reachability notification service desired to be received may be added to the request. If the above information is not included in the request, the UDM may regard that i) a notification request for all accesses is transmitted from the corresponding UE, ii) a notification request for only 3GPP access is transmitted, and iii) a notification request for only non-3GPP access is transmitted. This may be regarded as i), ii) or iii) on the basis of local configuration, operator policy, type/property (e.g., service provided by the entity) which has requested the reachability notification, subscriber information of the UE, etc. included in the UDM.

The UDM may store access type information indicating an access type of each entity which has requested a UE reachability notification, together with entity ID.

In step S1602a, the UDM stores identity of the service-related entity and sets URRP-AMF parameter as reception of the request. If a value of the URRP-AMF parameter is changed from "not set" to "set", the UDM transmits UE-REACHABILITY-NOTIFICATION-REQUEST (URRP-AMF) to the AMF. When the UDM requests the AMF of UE reachability notification, the UDM may provide an access type of the reachability notification service desired to be received. This access type may be determined based on access type information received from the entity which has requested the UDM of the UE reachability notification, information (local configuration, operator policy, etc.) configured in the UDM, type/property (e.g., service provided by the entity) of the entity, subscriber information of the UE, etc. The UDM may provide the above information only if the AMF is serving both of 3GPP access and non-3GPP access. If the AMF is serving the two accesses despite that the above information is not included therein, the AMF may regard that i) a reachability notification request for all accesses served by the AMF is transmitted from the corresponding UE, ii) a reachability notification request for only 3GPP access is transmitted, and iii) a reachability notification request for only non-3GPP access is transmitted. This may be regarded as i), ii) or iii) on the basis of local configuration, operator policy, subscriber information of the UE, etc. included in the AMF.

If a serving AMF for 3GPP access is different from a serving AMF for non-3GPP access, the UDM transmits the request message to the AMF related to an access of which UE reachability notification should be requested. If there is information indicating an access type of a reachability notification request, the AMF may determine the access type of the reachability notification request on the basis of the information. Or, even if there is no information indicating an access type of a reachability notification request, since the AMF knows an access type served by itself, the AMF may determine the access type of the reachability notification request.

The URRP-AMF parameter managed by the UDM may be managed per access.

For example, if a random entity requests UE reachability notification with respect to 3GPP access, the URRP-AMF parameter for 3GPP access is set to "set".

The AMF may store access type information indicating an access type of the UDM which has requested a UE reachability notification, together with entity ID.

In step S1602b, the SMSF transmits UE-REACHABILITY-NOTIFICATION-REQUEST (URRP-AMF) to the AMF. When the SMSF requests the AMF of UE reachability notification, the SMSF may add an access type of the reachability notification service desired to be received. If the above information is not included in the request, the AMF may regard that i) a notification request for all accesses is transmitted from the corresponding UE, ii) a notification request for only 3GPP access is transmitted, and iii) a notification request for only non-3GPP access is transmitted. This may be regarded as i), ii) or iii) on the basis of local configuration, operator policy, subscriber information of the UE, etc. included in the AMF. Alternatively, if the above information is not included in the request, the AMF may regard that a notification request for 3GPP access is transmitted because the SMSF is a function which is in charge of SMS. The AMF may store access type information indicating an access type of the SMSF which has requested a UE reachability notification, together with SMSF ID.

In step S1603, the AMF checks that a requesting entity has been granted to perform the request of the subscriber. If the entity has not been granted, the request is rejected (for example, if the requesting entity is recognized as being a valid entity, but not authorized for that subscriber) or the request is disregarded. (For example, if the requesting entity is not recognized). A proper O&M report is generated.

If the AMF has MM Context for the corresponding user, the AMF configures URRP-AMF to indicate that it is required to report UDM information regarding changes from UE reachability. (For example, when the next NAS activity with that UE is detected.)

The URRP-AMF parameter managed by the AMF may be managed per access. For example, if the UDM has requested UE reachability notification with respect to 3GPP access, the UDM sets the URRP-AMF parameter for 3GPP access to "set".

Since the UDM receives UE reachability notification request from another network entity, or when the UDM selects/determines the AMF to perform the UE reachability request, the UDM may transmit the UE reachability notification request to the AMF by unconditionally selecting/determining the AMF which is serving 3GPP access with respect to the corresponding UE (when the steps S1600 and 1602a are performed). This may be construed that the AMF related to 3GPP access is selected/determined when there are a plurality of AMFs which are serving the UE.

Figure 17:
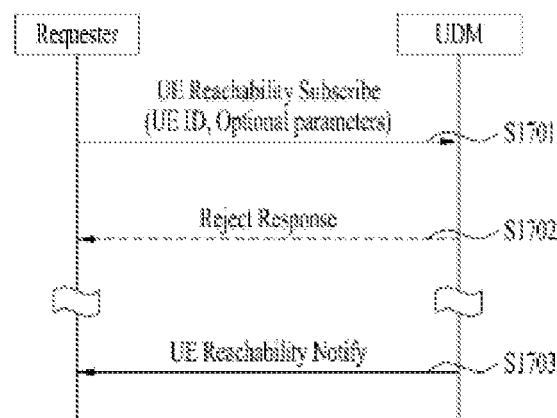

Service/service operation information flow of Nudm_UE Reachability_Notification service is shown in FIG. 17. In step S1701, the requester NF transmits UE reachability subscribe message for providing information such as UE ID and Optional Parameters to the UDM. UE ID (for example, SUPI) should identify UE by the UDM. When the Requester NF transmits the UE Reachability Subscribe message, access type information may be included in this message. The access type information may be included in this message only when the NF is the AMF. Also, the access type information may be included in the message only in case of non-3GPP access.

In step S1702, the UDM may selectively grant the requester on the basis of NF identities included in Optional Parameter. If the requester NF is not granted to use this service, the UDM transmits Reject Response.

In step S1703, if the requester NF is granted to access this service, the UDM transmits UE Reachability Notify message to the requester NF as soon as it acquires that the UE is reachable. The UDM provides the Requester NF with reachability information of the UE on access type related to the access type information, that is, requested access type (or access type regarded to be requested) on the basis of the access type information included or not included in the request message. At this time, the access type information may be included in the response. For example, if the Requester NF is regarded to perform UE Reachability Subscribe for 3GPP access, the UDM detects that the UE is reachable on 3GPP access and then reports the detected result to the Requester NF.

If the UDM receives the Subscribe message of step S1701, the UDM may be regarded to unconditionally subscribe UE reachability notification service for 3GPP access.

This may be construed that it is assumed that details on the access type information suggested in the step S1701 are not added.

In this case, Nudm_UE Reachability_Notification may be specified as listed in Table 7 below. In the following description, the scope of the present invention is not limited to a specific name, etc.

TABLE 7

Figure 18:

Service name: Nudm_UE Reachability_Notification
Description: The Requester NF subscribes the service that once the UE becomes reachable, the requester NF can be notified by the UDM.
Known NF Consumers: NEF.
Concurrent use: No.
Pre-requisite conditions: None
Post conditions: None
Inputs, Required: UE ID
Inputs, Optional: Optional Parameters.
Outputs, Required: UDM Notify the Requester NF when the corresponding UE is reachable
Outputs, Optional: None Meanwhile, Service/service operation information flow of Nudm_Subscription Data_UpdateNotification service is shown in FIG. 18. In step S1801, the UDM transmits Subscriber Data Update Notification (SUPI, Subscription Data) message to the Requester NF previously registered in the UDM through the previous Nudm_Serving NF_Registration. If there are a plurality of Requester NFs with respect to the UE (for example, there are two serving AMFs with respect to the UE, wherein one is AMF for 3GPP access and the other one is AMF for non-3GPP access), the UDM performs the operation of step S1801 for all of the Requester NFs.

The UDM may perform the above operation to be suitable for the access type served by the AMF. That is, if subscriber information for a specific access type is changed, the UDM may report the changed subscriber information to the Requester NF related to the corresponding access type. At this time, the access type of which subscriber information is changed may be added to the Subscriber Data Update Notification message.

For example, if subscriber information for non-3GPP access is changed, the UDM may report the changed subscriber information to the AMF related to this access. This means that the report is not given to the AMF related to 3GPP access if the corresponding AMF exists. In this case, Nudm_Subscription Data_UpdateNotification may be specified as listed in Table 8 below. In the following description, the scope of the present invention is not limited to a specific name, etc.

TABLE 8

Figure 19:
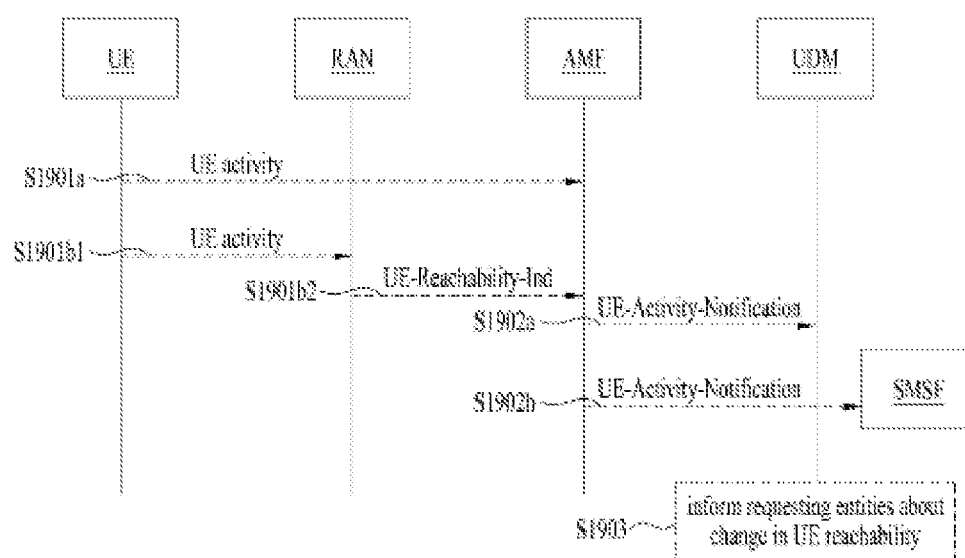

Service or service operation name:
Nudm_Subscription Data_UpdateNotification
Description: The UDM notifies NF consumer of the updates of UE's Subscriber Data.
Known NF Consumers: AMF, SMF, SMSF
Concurrent use: No.
Pre-requisite conditions: UDM detects UE's subscription data is updated
Post conditions: None.
Inputs, Required: Serving NF registered in UDM implicitly/explicitly for notification.
Inputs, Optional: None.
Outputs, Required: SUPI, Updated subscription Data
Outputs, Optional: None UE Activity Notification procedure is shown in FIG. 19. Referring to FIG. 19, in step S1901, the AMF receives indication for UE reachability (for example, Registration Request message or Service Request message from the UE, or UE Reachability Indication from RAN). The RAN may be 3GPP access related RAN, or N3IWF.

In step S1902, if the AMF includes MM context of the UE, and URRP-AMF for the UE is configured to immediately report if the UE is reachable, the AMF transmits UE-Activity-Notification (Permanent ID, UE-Reachable) message to the UDM (step S1902a) or the SMSF (step S1902b), and clears the corresponding URRP-AMF.

If the AMF manages the URRP-AMF parameter per access, and if the URRP-AMF for the access for which the UE is reachable is set to "set", a message reporting that the UE is active may be transmitted to an entity (e.g., UDM, SMSF, etc.) which has requested UE reachability notification with respect to the corresponding access. At this time, the message may include an access for which the UE is reachable. However, even if the message does not include information on the access, since the entity such as the UDM knows that the AMF is a serving AMF for a corresponding access, the entity may determine an access for which the UE is reachable. Afterwards, the AMF clears the URRP-AMF for the corresponding access.

In step S1903, if the UDM receives UE-Activity-Notification (Permanent ID, UE-Reachable) message or Update Location message for a UE that has URRP-AMF set, the UDM triggers proper notifications for entities that subscribe these notifications and clears the URRP-AMF for the UE.

If the UDM receives a report message indicating that the UE becomes active, from the AMF, the UDM may transmit a message for reporting that the UE is active to the entity which has requested the UE reachability notification with respect to the corresponding access (the method for identifying the access is described in the step S1902). At this time, the message may include an access for which the UE is reachable. If the UDM manages URRP-AMF parameter per access, the UDM clears URRP-AMF for access for which the UE is reachable.

Figure 20:
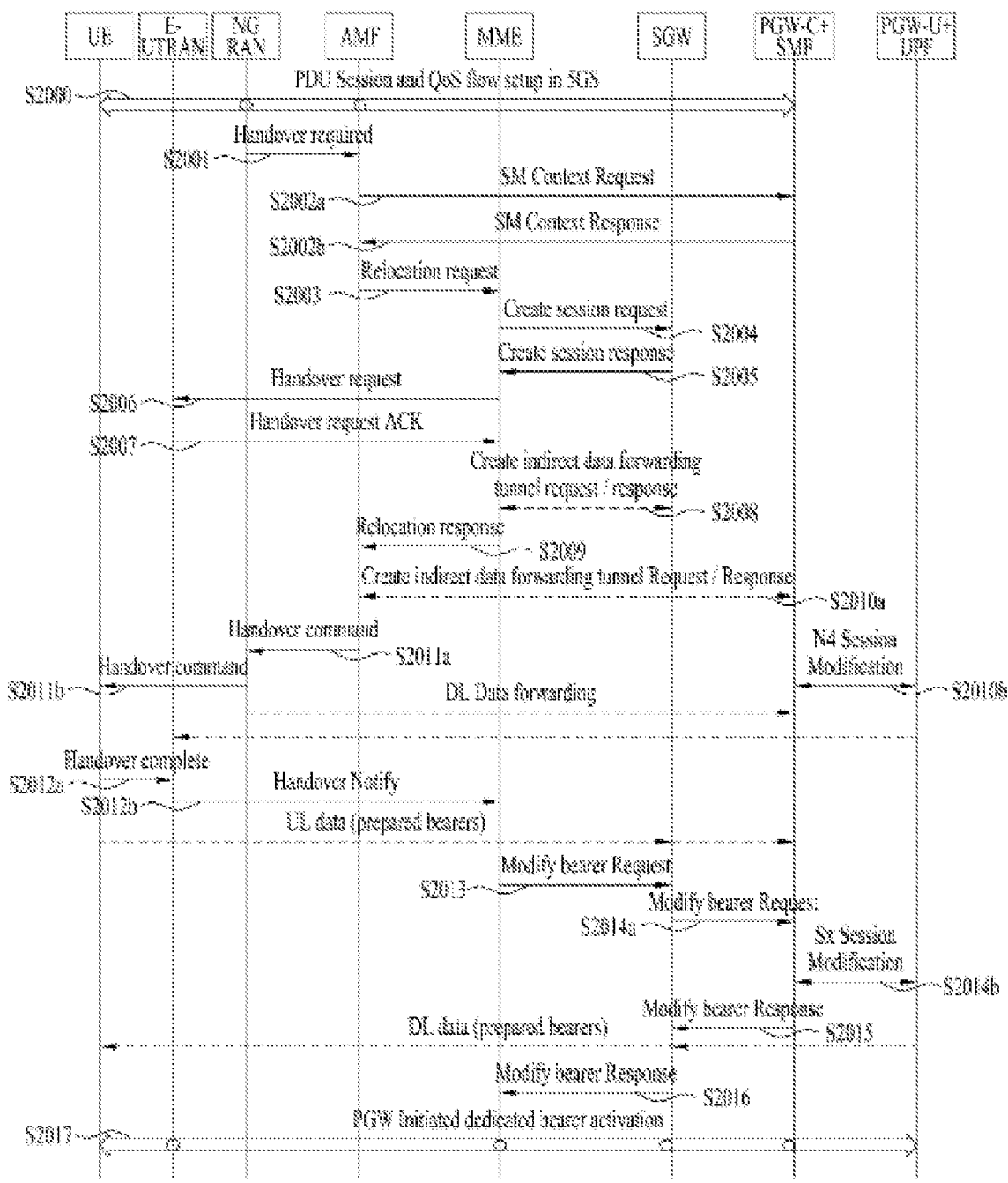

Meanwhile, 5GS to EPS handover for single-registration mode with Nx interface procedure of 3GPP TS 23.502v0.3.0 is shown in FIG. 20. Nx interface is an interface between AMF and MME for interaction of 5GS and EPS. Details of each step in FIG. 20 will be replaced with the description of 5GS to EPS handover for single-registration mode with Nx interface of 3GPP TS 23.502v0.3.0.

The MME may perform Update Location operation together with HSS (this may be construed as HSS+UDM, and may be referred to as UDM). This is to notify the HSS that the MME has become a serving node for the UE. Therefore, the MME transmits the Update Location Request message to the HSS, and the HSS which has received the Update Location Request message performs a Cancel Location operation together with the AMF. The AMF in which the HSS performs the Cancel Location operation is the AMF related to 3GPP access. That is, if the UE performs handover from 5GS to EPS, cancel location by the HSS and the UDM may be performed for the AMF of which access type is 3GPP. For example, if there are AMF #1 associated with 3GPP access with respect to the corresponding UE and AMF #2 associated with non-3GPP access, the AMF performs the Cancel Location operation together with the AMF #1. (Details of the Cancel Location will be understood with reference to the details described in the Nudm_Serving NF_RemoveNotification service.)

Unlike the above case, if the MME transmits Update Location Request message to the HSS, the HSS may keep the AMF related to 3GPP instead of cancelling the AMF. The Update Location operation of the MME may be caused by TAU operation of the UE or not. (The Update Location operation and the Cancel Location operation in the EPS will be understood with reference to TS 29.272.)

The above description may extensively or equally be applied to another scenario in which the UE changes system from 5G system to EPS as well as the shown procedure. Also, the above description may be applied to both of the case that the UE changes the 5G system to the EPS in an idle mode and the case that the UE changes the 5G system to the EPS in a connected mode. For example, if the UE which is in the idle mode (or if the UE of the idle mode) changes 5GS to the EPS, the UDM may perform the Cancel Location operation for the AMF of which access type is 3GPP, that is, may transmit a deregistration message to the AMF.

Also, the above description may be applied to both of the case that the UE is SR(Single Registered: registered in only one system) and the case that the UE is DR (Dual Registered: registered in two systems). Also, the above description may be applied to both of the case that there is interface (Nx interface) between the 5G System and the EPS and the case that there is no interface.

Figure 21:
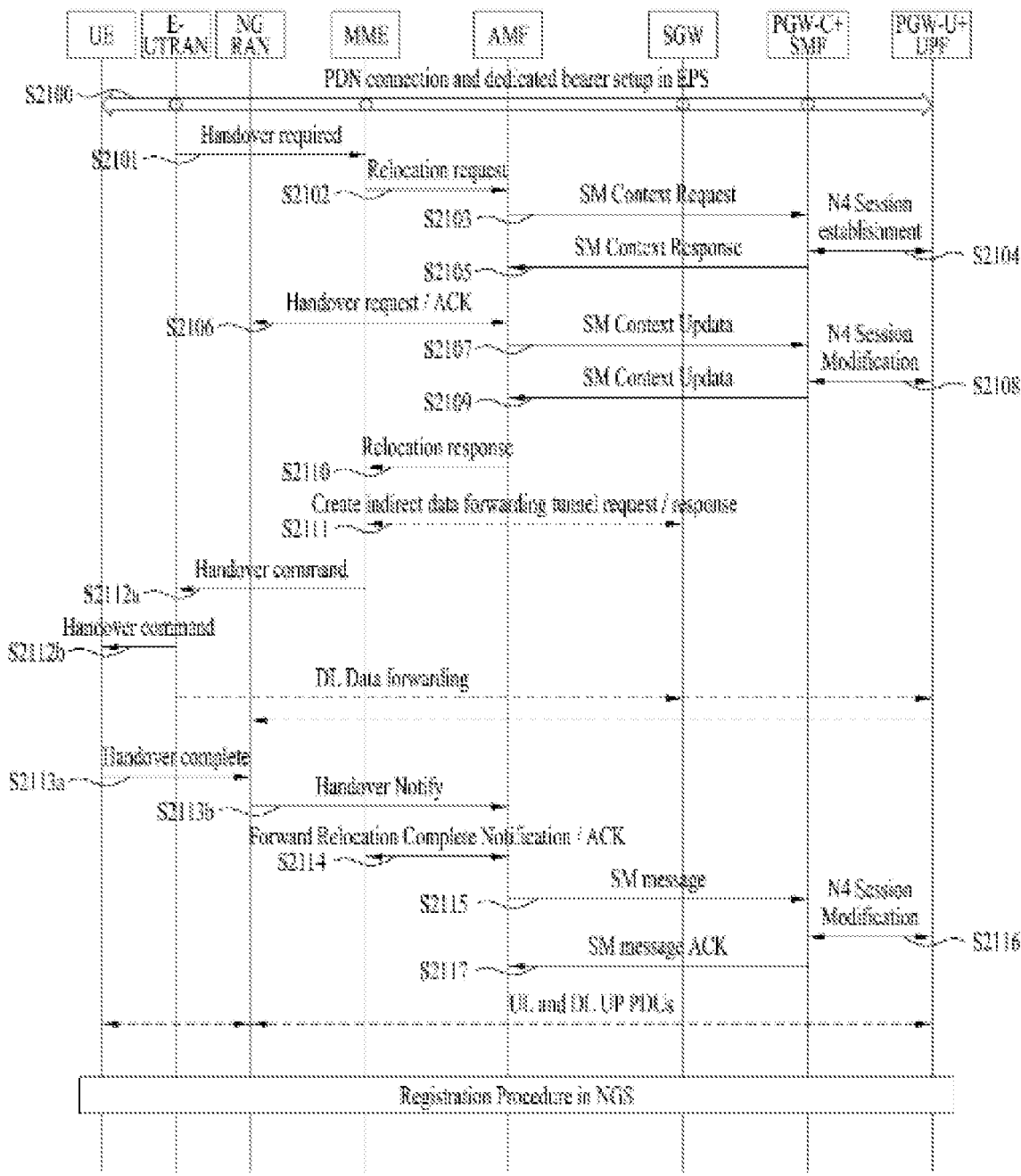

Meanwhile, EPS to 5GS handover using Nx interface procedure of 3GPP TS 23.502v0.3.0 is shown in FIG. 21.

Referring to FIG. 21, in step S2101, source E-UTRAN determines that the UE should perform handover to 5G-RAN. The E-UTRAN transmits Handover Required (Target 5G-RAN Node ID, Source to Target Transparent Container) message to the MME.

In step S2102, the MME selects a target AMF, and transmits Nx Relocation Request (Target 5G-RAN Node ID, Source to Target Transparent Container, EPS MM Context, PDN Connection info) message to the AMF.

When the MME selects the target AMF, the MME may query the HSS (this may be construed as HSS+UDM, and may be referred to as UDM). If the serving AMF for the UE already exists, the HSS may provide the MME with the information indicating that the serving AMF exists. At this time, the HSS may be provided only if the serving AMF and the MME belong to the same PLMN. Unlike this case, PLMN information may be provided to the MME together with the serving AMF, whereby the PLMN information may be used such that the MME may select/determine the target AMF. Also, the HSS may provide information (e.g., AMF ID) on the AMF even in the case that the serving AMF is AMF related to non-3GPP access. If the serving AMF for the UE exists for 3GPP access and non-3GPP access, the HSS may provide serving AMF information related to the 3GPP access.

Details of the other steps S2103 to S2118 will be replaced with the description of 5GS to EPS handover for single-registration mode with Nx interface of 3GPP TS 23.502v0.3.0.

Referring to FIG. 21, the AMF may perform Update Location operation together with UDM (this may be construed as HSS+UDM, and may be referred to as UDM). This is to notify the UDM that the AMF has become a serving node for the UE. If the AMF performs the Update Location operation (or the operation described in Nudm_Serving NF_Registration service of FIG. 11) for the UDM, the UDM performs the Cancel Location operation together with the MME. Unlike this case, the UDM may keep the MME instead of cancelling the MME.

The above description may extensively or equally be applied to another scenario in which the UE changes system from 5G system to EPS as well as the shown procedure. Also, the above description may be applied to both of the case that the UE changes the 5G system to the EPS in an idle mode and the case that the UE changes the 5G system to the EPS in a connected mode. Also, the above description may be applied to both of the case that the UE is SR(Single Registered: registered in only one system) and the case that the UE is DR (Dual Registered: registered in two systems). Also, the above description may be applied to both of the case that there is interface (Nx interface) between the 5G System and the EPS (interface between the MME and the AMF) and the case that there is no interface.

Although the operation suggested as above has been described based on that the NF (Network Function) is AMF, without limitation to this case, the other NFs (e.g., SMF, PCF, SMSF, etc.) may perform the operation suggested in the present invention. In the aforementioned description, the network function, the network entity and the network node refer to the same entity.

Figure 22:
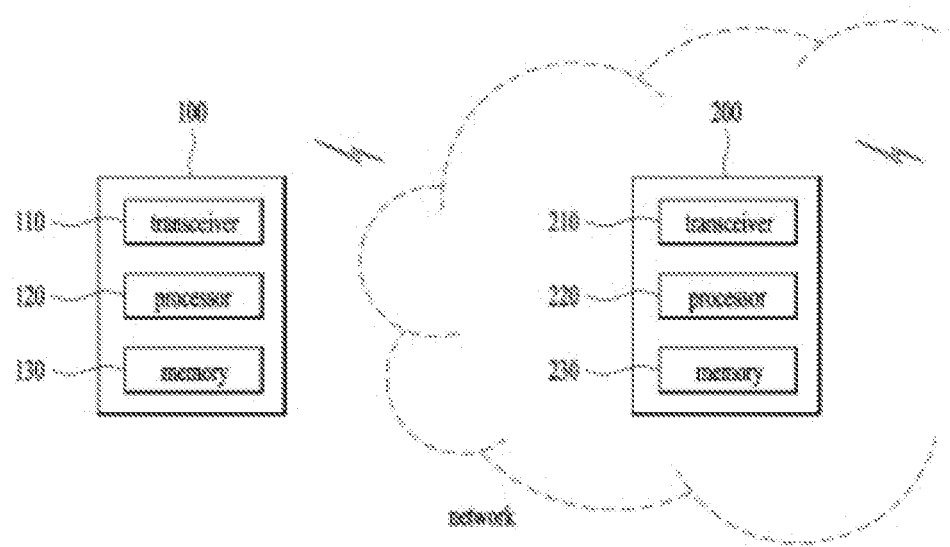
FIG. 22 is a diagram illustrating a configuration of a node device according to the embodiment of the present invention.

FIG. 22 is a diagram illustrating a configuration of a user equipment and a network node device according to the preferred embodiment of the present invention.

Referring to FIG. 22, a UE 100 according to the present invention may include a transceiver 110, a processor 120 and a memory 130. The transceiver 110 may be configured to transmit various signals, data and information to an external device and receive various signals, data and information from the external device. The UE 100 may be connected with the external device through the wire and/or wireless. The processor 120 may control the overall operation of the UE 100, and may be configured to perform a function of operation-processing information to be transmitted to and received from the external device. The memory 130 may store the operation-processed information for a predetermined time, and may be replaced with a buffer (not shown). Also, the processor 120 may be configured to perform a UE operation suggested in the present invention.

Referring to FIG. 22, the network node device 200 according to the present invention may include a transceiver 210, a processor 220, and a memory 230. The transceiver 210 may be configured to transmit various signals, data and information to an external device and to receive various signals, data and information from the external device. The network node device 200 may be connected with the external device through the wire and/or wireless. The processor 220 may control the overall operation of the network node device 200, and may be configured to allow the network node device 200 to perform a function of operation-processing information to be transmitted to and received from the external device. The memory 230 may store the operation-processed information for a predetermined time, and may be replaced with a buffer (not shown). Also, the processor 220 may be configured to perform a network node operation suggested in the present invention. In detail, a UDM receives a message related to serving AMF registration of the UE, which includes access type information and ID (Identity) information, from a first AMF, and if a second AMF registered as a serving AMF of the UE, which corresponds to the access type information, exists, the UDM may transmit a deregistration related message to the second AMF.

Also, the details of the aforementioned UE 100 and the aforementioned network node device 200 may be configured in such a manner that the aforementioned various embodiments of the present invention may independently be applied to the aforementioned UE 100 and the aforementioned network node device 200, or two or more embodiments may simultaneously be applied to the aforementioned UE 100 and the aforementioned network node device 200, and repeated description will be omitted for clarification.

The aforementioned embodiments according to the present invention may be implemented by various means, for example, hardware, firmware, software, or their combination.

If the embodiments according to the present invention are implemented by hardware, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the method according to the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

Although the aforementioned various embodiments of the present invention have been described based on the 3GPP system, the aforementioned embodiments may equally be applied to various mobile communication systems.

The invention claimed is:

1. A method for enabling a UDM (Unified Data Management) to perform a registration related procedure of an AMF (Access and Mobility Management Function) in a wireless communication system, the method comprising:
    receiving, by the UDM, a first message related to serving AMF registration of a UE, which includes (i) access type information indicating one of 3GPP access and non-3GPP access and (ii) AMF ID (Identity) information, from a first AMF;
    transmitting, by the UDM, a second message for deregistration of a second AMF registered as a serving AMF of the UE,
    wherein the second message is only transmitted in a first case among a first case and a second case,
    wherein the first case means an access type of the first AMF is 3GPP access and an access type of the second AMF is 3GPP access,
    wherein the second case means an access type of the first AMF is non-3GPP access and an access type of the second AMF is 3GPP access.

2. The method according to claim 1, further comprising:
    storing, by the UDM, the access type information related to the AMF and the AMF ID information,
    wherein the access type information and the AMF ID information are related to the first AMF.

3. The method according to claim 1, further comprising:
    receiving, by the UDM, a third message related to deletion of UE context from a Network Function (NF) that corresponds to AMF, wherein the third message includes access type information.

4. The method according to claim 1, wherein, based on the UDM transmitting a deregistration related message to the second AMF due to subscription withdrawn, the UDM indicates an access type of the deregistration related message.

5. The method according to claim 1, further comprising:
    transmitting, by the UDM to the NF, serving AMF information corresponding to the access type, based on a fourth message for requesting the serving AMF information being received from the NF, and wherein the fourth message includes access type information.

6. The method according to claim 1, further comprising:
    receiving, by the UDM, a request for providing UE reachability information from the NF, wherein the request for requesting to provide UE reachability information includes access type information.

7. The method according to claim 1, wherein, based on a handover from a 5GS (5G system) to an EPS (Evolved Packet System), cancel location operation by the UDM and HSS (Home Subscriber Server) is performed for AMF of which access type is 3GPP.

8. The method according to claim 1, wherein, based on changes from a 5GS to an EPS of UE in an idle mode, a cancel location operation by the UDM is performed for AMF of which access type is 3GPP.

9. A UDM (Unified Data Management) device configured to perform a registration related procedure of an AMF (Access and Mobility Management Function) in a wireless communication system, the UDM comprising:
    a memory; and
    a processor coupled with the memory,
    wherein the processor is configured to receive a first message related to serving AMF registration of a UE, wherein the first message includes (i) access type information indicating one of 3GPP access and non-3GPP access and (ii) AMF ID (Identity) information, from a first AMF, and transmit a second message for deregistration of a second AMF registered as a serving AMF of the UE,
    wherein the second message is only transmitted in a first case among a first case and a second case,
    wherein the first case means an access type of the first AMF is 3GPP access and an access type of the second AMF is 3GPP access,
    wherein the second case means an access type of the first AMF is non-3GPP access and an access type of the second AMF is 3GPP access.

10. The UDM device according to claim 9, wherein the processor is further configured to store the access type information related to the AMF and the AMF ID information,
    wherein the access type information and the AMF ID information are related to the first AMF, and.

11. The UDM device according to claim 9, wherein the processor is further configured to receive a third message related to deletion of UE context from a Network Function (NF) that corresponds to AMF, and the third message includes access type information.

12. The UDM device according to claim 9, wherein, based on the UDM transmitting a deregistration related message to the second AMF due to subscription withdrawn, the UDM indicates an access type of the deregistration related message.

13. The UDM device according to claim 9, wherein the processor is further configured to transmit serving AMF information corresponding to the access type to the NF, and the fourth message includes access type information, based on a fourth message for requesting the serving AMF information being received from the NF.

* * * * *